United States Patent Office 2,951,261
Patented Sept. 6, 1960

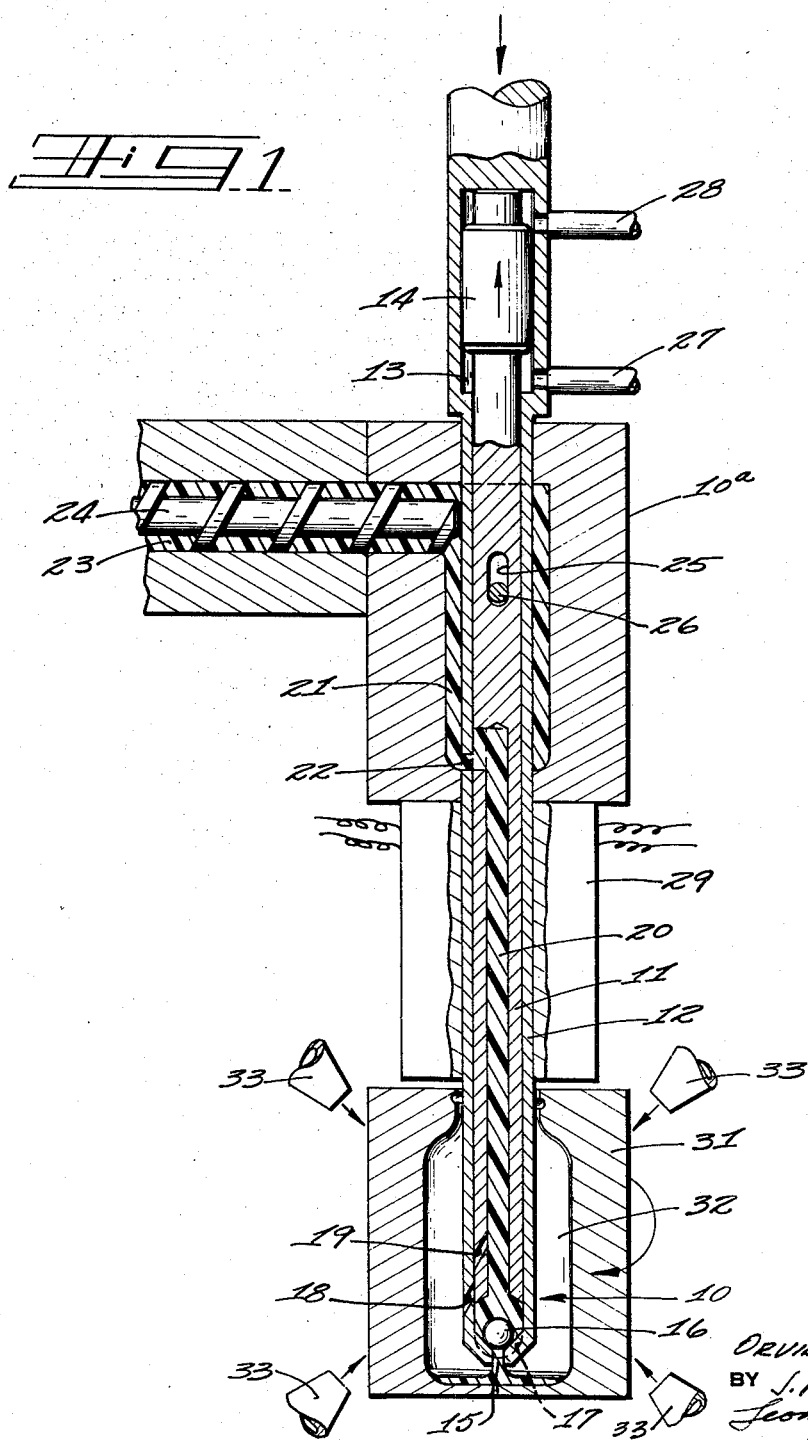

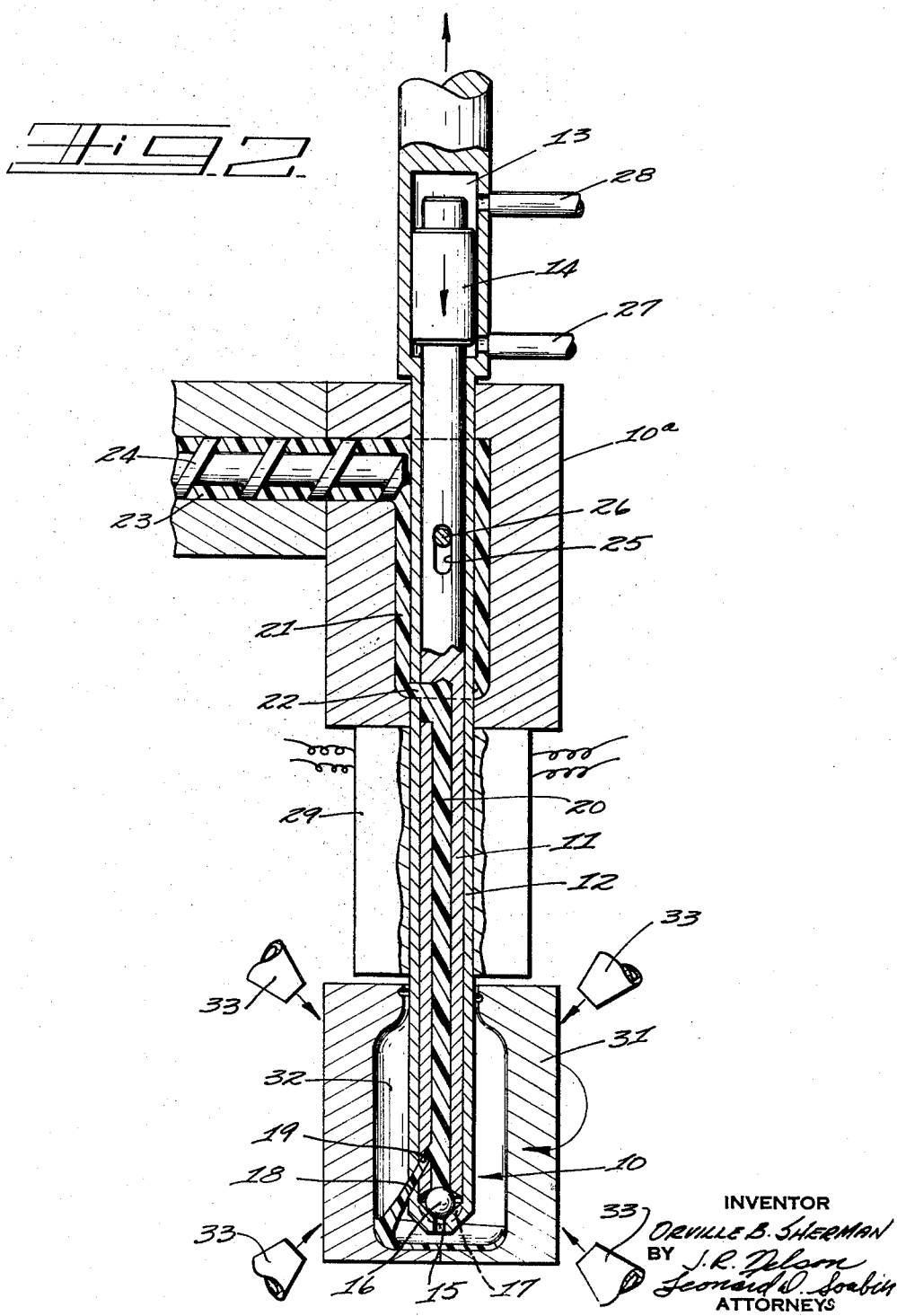

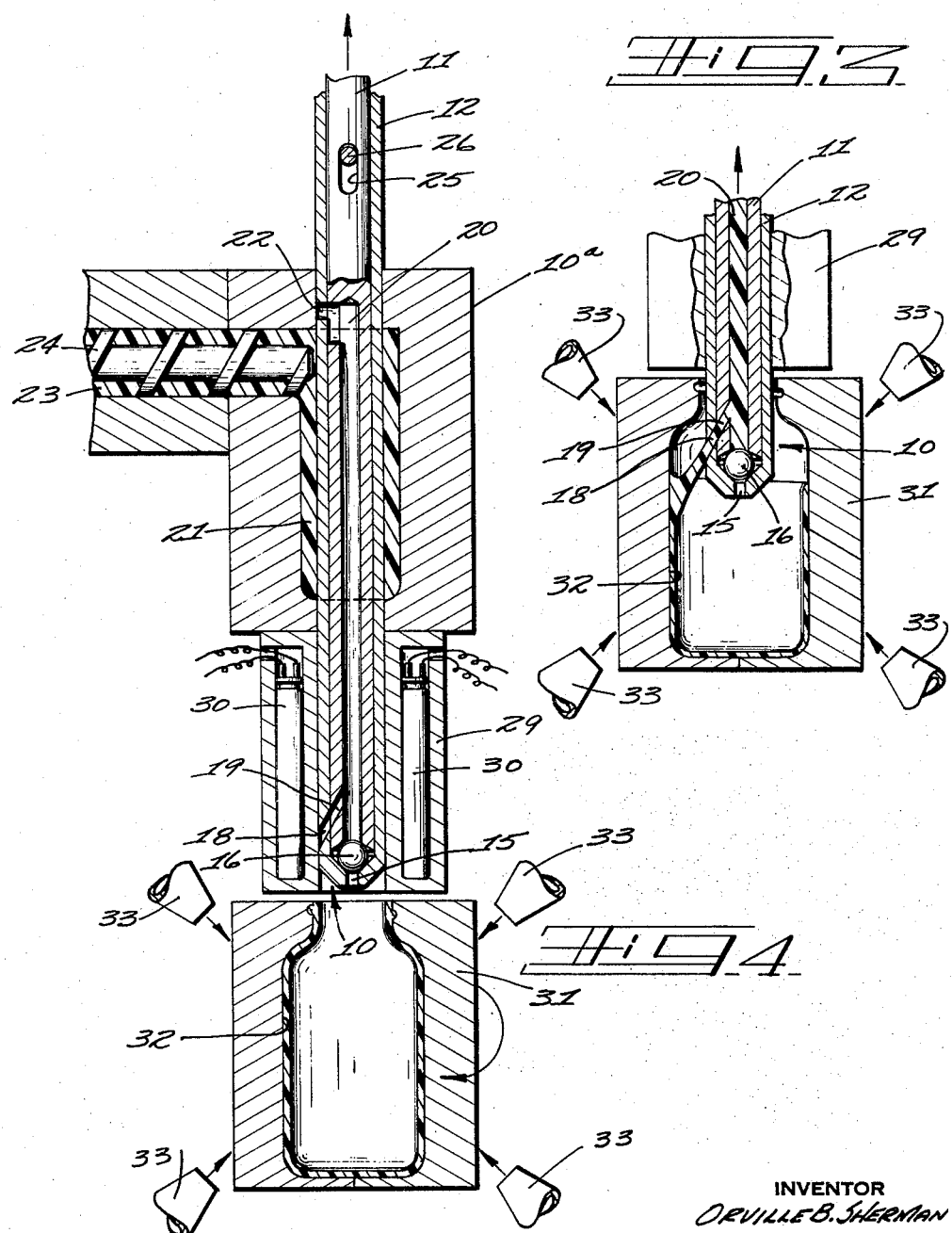

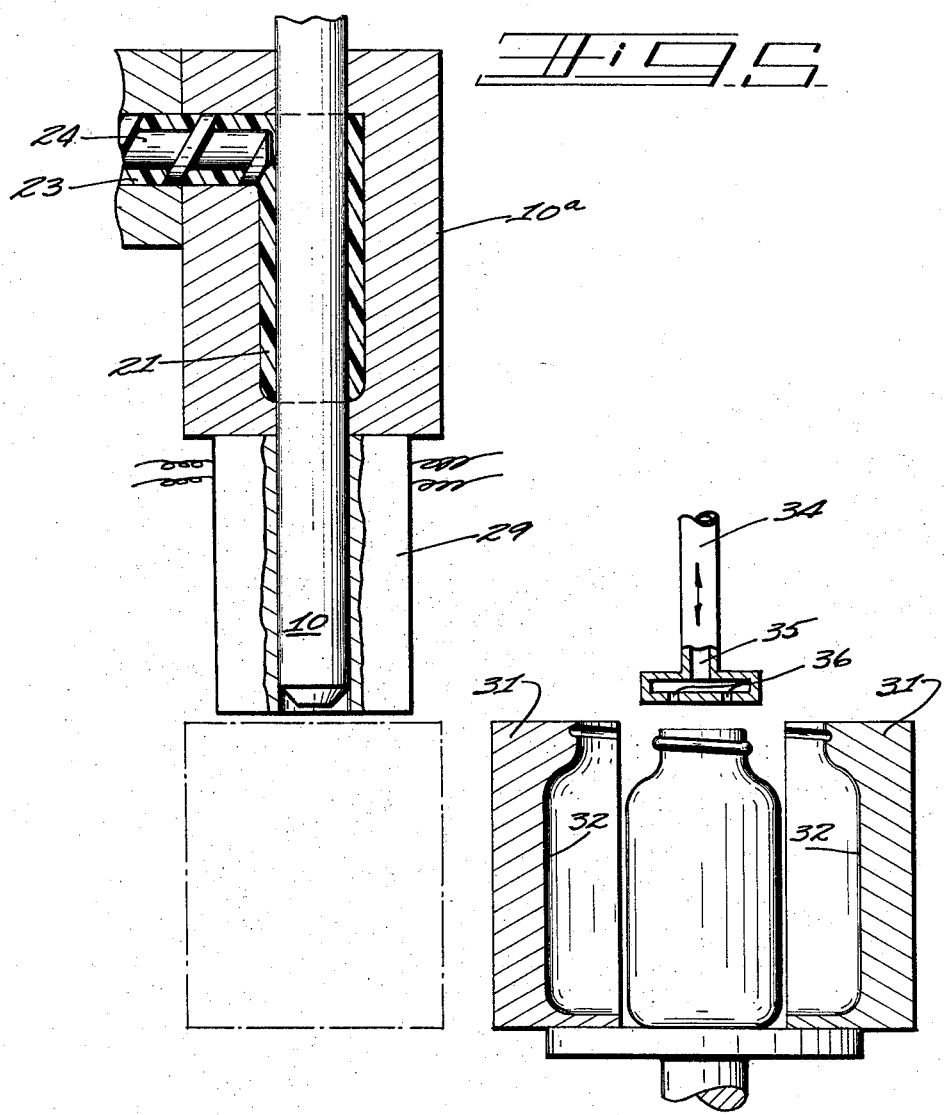

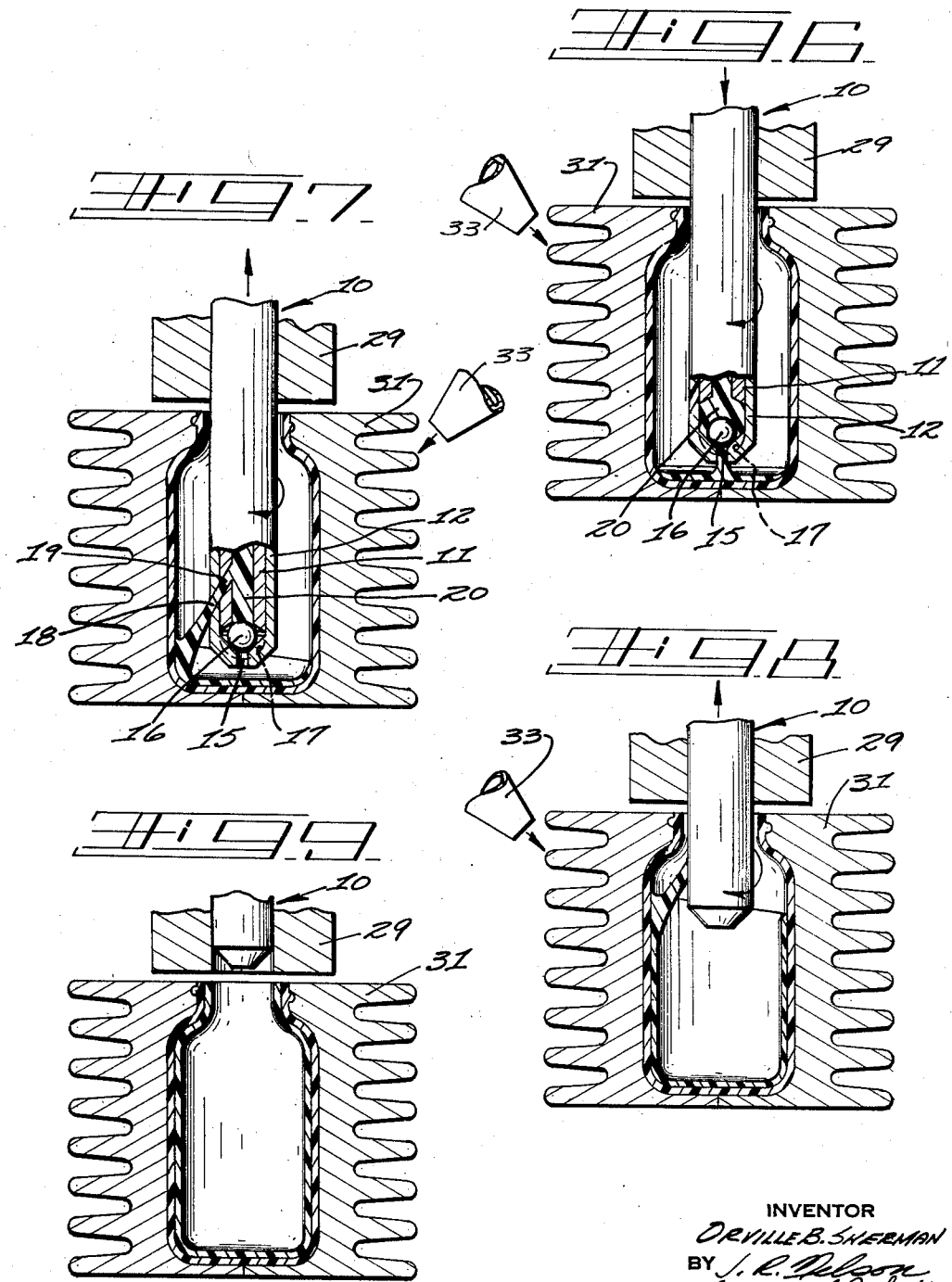

2,951,261

APPARATUS FOR FORMING HOLLOW PLASTIC ARTICLES FROM FLUID BASE MATERIALS

Orville B. Sherman, West Orange, N.J., assignor to Owens-Illinois Glass Company, a corporation of Ohio Original application Nov. 6, 1956, Ser. No. 620,749. Divided and this application Nov. 25, 1958, Ser. No. 777,540

5 Claims. (Cl. 18—5)

This invention relates to apparatus for forming hollow plastic articles, and more specifically plastic containers formed of a fluid base thermoplastic material by centrifugally working it in a mold.

There are a variety of well-known polyamide structure organic materials, taken from the family of thermoplastics, having properties which make them very desirable for use as containers, but these materials have such low viscosities as to be incapable of any conventional forming technique that is practical and economical, such as by blow-molding techniques presently employed on higher viscosity thermoplastic materials. A prime example of such material is nylon which, while thermoplastic, has such low viscosity, cohesion and tensile strength when heated as to be incapable of expansion into container or other hollow formations by blow mold methods.

Accordingly, it is an object of this invention to provide an economical apparatus for forming hollow plastic articles from fluid base thermoplastic materials.

Another object of this invention is to provide apparatus for extruding fluid base thermoplastic materials for centrifugally working them in a mold, and distributing such material about the mold to form a finished shape of hollow plastic article.

Another object of this invention is to provide apparatus for forming multiple-walled hollow plastic articles by blow forming a wall thickness of a thermoplastic susceptible to blow forming, and centrifugally working a second wall thickness of a fluid base thermoplastic material, the two thicknesses forming a laminate wall of a hollow finished article.

The specific nature of this invention, as well as other objects and advantages thereof, will become apparent to those skilled in the art from the following detailed description, taken in conjunction with the annexed sheets of drawings on which, by way of preferred example only, are illustrated several forms of this invention.

On the drawings:

Fig. 1 is a schematic sectional view of an extruder depositing a layer of plastic material onto the bottom surface of a molding cavity of a mold in accordance with this invention.

Fig. 2 is a schematic sectional view of an extruder redirecting the flow of extruded plastic material onto the sides of the molding cavity to form a side wall layer integral with the bottom layer in accordance with this invention.

Fig. 3 is a schematic sectional view, illustrating the apparatus of this invention withdrawing from the molding cavity to direct extruded material along the length of the sides of the mold.

Fig. 4 is a schematic sectional view, showing the extruder nozzle disconnected from the source of plastic material after a finished article is formed, the nozzle being retracted into a heater.

Fig. 5 is a schematic sectional view, illustrating the apparatus in which fluid pressure is introduced into the finished article.

Figs. 6–9 are schematic sectional views illustrating a modification of this invention in which a layer of plastic material is formed on the interior of a blow molded plastic layer contained in an air cooled mold to form, in laminate relationship, a multiple-walled finished article.

The operation of the apparatus consists generally in inserting an extruder nozzle into a mold and imparting relative rotation between the mold and extruder nozzle. An extruded stream of plastic material is directed onto the bottom of the molding cavity and is distributed thereabout by centrifugal force to form a bottom layer for making up the bottom wall of the finished article. The extruded stream of plastic material is then redirected to impinge the periphery of the bottom layer to begin forming side walls of the article. The extruder nozzle is withdrawn from the mold at a regulated rate and material is uniformly applied to the sides of the molding cavity and held in place by centrifugal force until solidified. The apparatus of this invention is particularly adaptable to the formation of containers having at least one wall ply formed of fluid base polyamide plastic material, such as nylon.

As is well known in the art, all common varieties of nylon cannot be successfully formed into container shapes by blow molding technique due to their inherent low viscosity, cohesion and tensile strengths which exist upon being heated sufficiently to become thermoplastic. As applied to the manufacture of nylon containers, this invention contemplates extrusion of a stream of nylon alternatively from two separately directed orifice openings in an extruder nozzle when inserted into the open end of a mold, the first of these orifices of the extruder nozzle is directed toward the closed end surface of the molding cavity and controlled to deposit thereon a predetermined amount of material, whereupon the extrusion is shifted to a radially directed orifice which deposits the material along the sides of the molding cavity as the extruder nozzle is withdrawn at a predetermined regulated rate. The material is distributed and held in place by centrifugal force. To assist in solidifying the distributed material, the mold is fluid cooled to maintain the temperature of the mold below that of the solidifying temperature of the material being formed.

In Fig. 1, reference numeral 10 indicates an extruder nozzle assembly comprising an inner extrusion member 11 inserted for axial sliding movement in a sleeve member 12 which is inserted for sliding axial movement in main body 10a. Near the upper end of sleeve member 12 is a cylinder chamber 13 built integral with sleeve member 12 to receive a piston 14, which comprises an integral annular enlarged portion of inner extrusion member 11.

The extrusion end of sleeve member 12 is partially closed and is provided with an axial end orifice 15. A ball 16 is positioned over end orifice 15 and an end slot 17 in sleeve member 12 surrounds ball 16 providing a communicating passage for flow of material between the hollow central portion of sleeve 12 and end orifice 15. Along one side of inner extrusion member 12 is a radially directed side orifice 18 adapted to register with a similar radially directed side orifice 19 in sleeve member 12 whenever inner member 11 is shifted axially within sleeve member 12, so that its lower end engages ball 16. A central passage 20 is provided along part of the length of inner member 11 to communicate with passage 21 in main body 10a through a radial bore 22 through one side of members 11 and 12. Passage 21, at its remote end, is joined by radial passage 23 to the outlet of an extruder 24 furnishing heated material in extrudable form.

Inner extrusion member 11 has a slot 25 intermediate its length carrying a lug 26. Fluid under pressure is supplied through fluid conduits 27 and 28 to actuate, in either direction, piston 14 of the double-acting cylinder-piston assembly 13—14. By supplying fluid under pressure through conduit 27, fluid is exhausted through conduit 28 and inner extension member 11 is retracted in sleeve member 12 until lug 26 engages the end of slot 25, thereby setting the extruder nozzle to extrude material through its end orifice 15, as shown in Fig. 1. If fluid pressure flow is reversed so that pressured fluid is introduced through conduit 28, piston 14 will move toward end orifice 15 until the end of inner member 11 seats on ball 16, thereby closing end orifice 15, and side orifices 18 and 19 on members 11 and 12 are in registry, as shown in Fig. 2. This redirects the stream of extruded material through side orifices 18 and 19.

Sleeve member 12 is carried by a means (not shown) for shifting it axially in main body 10a to control the withdrawal movement of the extruder nozzle members (11, 12) and position the nozzle at various longitudinal points along the line of movement during the forming cycle.

In operating the apparatus of this invention, the extruder nozzle assembly 10 is initially retracted within a block 29, which is preferably temperature controlled by electric heater elements 30 (Fig. 4), for maintaining any material in passage 20 at workable temperatures. Heater elements 30 provide an additional temperature control over the material in passage 20 flowing through the extruder nozzle, and also preheats the nozzle tip when it is retracted and out of operation. In this position radial passage 23 is disconnected from passage 21 and the source of material furnished by extruder 24 is shut off from extruder nozzle assembly 10. A partible finishing mold 31 is brought into concentric alignment with sleeve member 12. Extruder nozzle assembly 10 is then lowered into mold 31, until end orifice 15 thereof is spaced slightly from the end of molding cavity 32 (Fig. 1).

The mold 31 is rotated about its central axis relative to extruder nozzle 10. This may be accomplished in one of two ways, by either applying a rotary drive mechanism (not shown) to rotate mold 31, or by applying a rotary drive mechanism (not shown) to impart rotation to sleeve member 12. It is contemplated by this invention that relative rotation be applied between the extruder nozzle and the mold, so that the extruded material is distributed and held in place about the molding cavity by centrifugal force until the material is cooled sufficiently to form its own supporting shape.

After the extruder nozzle is inserted to the position shown in Fig. 1, radial passage 23 is connected to passage 21 and material is extruded at end orifice 15 onto the closed end of the molding cavity 32. The material is extruded until a predetermined amount has been deposited in the mold and distributed about the closed end thereof to form a bottom wall by centrifugal force. The inner member 11 is then shifted onto its seat on ball 16 so that side orifices 18 and 19 register with one another (Fig. 2). Material is then extruded through the side orifices 18 and 19 and directed radially to impinge the outer periphery of the formed bottom wall, whereupon extruder nozzle 10 is withdrawn towards the open end of mold cavity 32 at a regulated rate. During this regulated withdrawal, extruded material is deposited along the sides of the molding cavity 32 to the top thereof to form the finished side walls of the finished article integral with the bottom wall or closed end of the article (Fig. 3).

During the time the forming operation is being performed, a coolant, such as air, is directed from nozzles 33 against the sides of mold 31 to maintain the mold at a temperature below the solidifying temperature of the material being formed therein.

After the finished article has been formed, the relative rotation between the extruder nozzle and mold 31 is stopped and extruder nozzle 10 is withdrawn into block 29 where heat is supplied through heater element 30 to maintain any material remaining in passage 20 at workable temperatures and temperature condition extruder nozzle 10 prior to beginning the next cycle (Fig. 4).

Additional cooling and forming may be achieved by shifting mold 31 to a subsequent station and lowering a blow head 34 over the open end of a mold 31 (Fig. 5). Cool air under pressure is supplied through central passage 35 and orifices 36 of blow head 34 into the interior of the formed article held in mold 31.

This air is administered internally of the article primarily for cooling but is advantageous in completing a uniform finish to the article by exerting an internal pressure.

As shown in Fig. 5, after the fluid has been administered internally of the article, blow head 34 is raised and mold 31 is opened for facilitating removal of the finished article.

Referring to Figs. 6–9, a modification of the invention is represented. In this modification, a multiple-walled article may be formed by first blow forming a first wall thickness of a finished article in mold 31 and then aligning mold 31 with extruder nozzle 10 and centrifugally forming a second wall thickness therein, as previously described. The first wall thickness is formed from a first thermoplastic material which is readily susceptible to blow forming, and the second wall thickness is formed of a fluid base thermoplastic material contemplated as formable by this invention. An example of the first thermoplastic material applicable to this modification is polyethylene, and the second thermoplastic material being a polyamide such as nylon.

Since a greater degree of cooling to mold 31 is necessary in this modified form of the invention due to the prior molding of the first wall thickness therein, mold 31 is here shown with spaced annular cooling ribs to which the coolant is supplied by nozzles 33.

In applying this modified form of the invention, let it be understood, however, that the invention is not to be limited to the aforementioned sequence of forming the multiple-wall sections. For example, it is also contemplated by this invention to first centrifugally work the second thermoplastic material in mold 31 to form an outer wall thickness of the second thermoplastic material, and then shift mold 31 to blow form an inner wall thickness of the first thermoplastic material.

From the foregoing description it will be apparent that this invention provides a simple and economical method of forming hollow plastic articles from fluid base thermoplastic materials which are incapable of forming by conventional techniques, such as by blow molding techniques. Hence, the method of this invention permits the commercial utilization of a large class of plastic materials in a variety of forms that have heretofore been impractical to manufacture on an economical basis.

This application is a division of my copending application, Serial No. 620,749, filed November 6, 1956, now abandoned.

Various modifications may be resorted to within the spirit and scope of the appended claims.

I claim:

1. In a device for forming a hollow plastic article, the combination of an article forming mold and a cooperating extrusion nozzle to dispense plastic material in the mold and having an axially disposed orifice and a radially disposed orifice, the two being in spaced relationship one to the other, said mold and nozzle being rotatable relative to each other, means for providing reciprocal axial movement of said nozzle relative to the mold for inserting the nozzle into the mold and withdrawing it therefrom, an extruder means supplying a source of plasticized material under pressure, conduit means connecting said source and nozzle and, actuable valve means in said nozzle for effecting individually an axial and a radial issuance of said material from the respective orifices of said nozzle, and means for actuating said valve means when the nozzle is inserted into the mold to dispense said material through the axial orifice and against the mold to form one portion of the article and, while the nozzle is undergoing axial movement, dispense said material through the radial orifice and against the mold to form the other portion of the article, said portions being integrally joined to form the article.

2. An apparatus for making hollow plastic articles comprising a partible finishing mold defining an interior cavity, when closed, and including an opening therefrom, a source of plasticized material under pressure spaced from said mold, a nozzle insertable into said mold cavity through its opening and having an axially disposed orifice and a radially disposed orifice, conduit means connecting said source and said nozzle, said mold and nozzle being rotatable relative to each other about a longitudinal axis, means for reciprocably moving said nozzle axially for insertion within the cavity of the mold to an extended position in axially spaced relationship with an interior surface of the mold opposite said opening, valve means actuatable in said nozzle for individually connecting the axial orifice and said source and for disconnecting the axial orifice and the source and connecting the rotary orifice and said source, and means for actuating said valve means to dispense said material from the axial orifice and against the said axially spaced surface of the mold when the nozzle is inserted in the mold cavity to its extended position to form one wall portion of the article, and dispense said material from the radial orifice to impinge on a radially spaced surface of the mold cavity and join the radially dispensed material with the margins of the said wall portion of the article formed from the axially dispensed material, whereby to provide a continuity of the material dispensed from said nozzle and form the remaining wall portions of the article upon withdrawing the nozzle from within the mold cavity.

3. An apparatus for making hollow plastic articles comprising a source of plasticized material under pressure, a mold spaced from said source having an interior cavity and an opening therefrom, a nozzle insertable into said mold cavity through its opening and rotatable relative to the mold, means for inserting said nozzle axially into the molding cavity to extended position in proximity to one portion of the mold and withdrawing it from the mold, conduit means connecting said source and said nozzle, said nozzle having an axially disposed orifice and a radially disposed orifice, actuatable valve means carried by the nozzle for individually connecting said orifices and the conduit means to dispense said material, and means for actuating said valve means to direct material through said axial orifice of the nozzle and against said mold while the nozzle is extended therein to form a layer of material over the said one portion thereof and to direct material through said radial orifice and against the mold while withdrawing the nozzle to form an integral layer of material over the remaining portion thereof.

4. The combination defined in claim 3, wherein said nozzle is mounted to reciprocate in a surrounding heater element, said axially and radially disposed orifices of the nozzle being housed in said element whenever said nozzle is withdrawn from the mold.

5. In a plastic extruder apparatus, a valve structure for use in forming hollow plastic articles, comprising a hollow element having an axial passage communicating with the extruder to receive plasticized material therefrom, a sleeve member closed at one end and housing said element for movement therein, an axial end orifice in said one end of the sleeve member, a radial orifice in the side of said sleeve member, an internal closure means over said end orifice, passage means in said sleeve member by-passing said closure means connecting the interior of the sleeve and said end orifice, a corresponding port in the side of said hollow element communicating with the axial passage thereof, and means for shifting said hollow element relative to said sleeve member between alternative operating positions for (1) connecting said axial passage and said end orifice and disconnecting said port and said radial orifice, and (2) connecting said passage, said port and said radial orifice and disconnecting said axial passage and said end orifice.

References Cited in the file of this patent
UNITED STATES PATENTS

| | | |
|---|---|---|
| 705,754 | Harris | July 29, 1902 |
| 1,840,027 | Fetter | Jan. 5, 1932 |
| 2,218,411 | Albach | Oct. 15, 1940 |
| 2,870,054 | Amos | Jan. 20, 1959 |

FOREIGN PATENTS

| | | |
|---|---|---|
| 361,090 | Great Britain | Nov. 19, 1931 |
| 460,291 | Great Britain | Jan. 18, 1937 |